(12) United States Patent
Knutson et al.

(10) Patent No.: US 6,597,750 B1
(45) Date of Patent: Jul. 22, 2003

(54) OPPOSITE POLARIZATION INTERFERENCE CANCELLATION IN SATELLITE COMMUNICATION

(75) Inventors: Paul Gothard Knutson, Indianapolis, IN (US); Kumar Ramaswamy, Indianapolis, IN (US); David Lowell McNeely, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/423,868

(22) PCT Filed: Jun. 19, 1998

(86) PCT No.: PCT/US98/12886
§ 371 (c)(1),
(2), (4) Date: Nov. 15, 1999

(87) PCT Pub. No.: WO99/00908
PCT Pub. Date: Jan. 7, 1999

(51) Int. Cl.[7] .............................. H04B 7/10; H04B 1/10; H04L 1/02
(52) U.S. Cl. ..................... 375/347; 375/349; 375/350
(58) Field of Search ................................. 375/347, 346, 375/349, 350

(56) References Cited

U.S. PATENT DOCUMENTS 4,577,330 A * 3/1986 Kavehrad ................... 375/235
4,910,468 A * 3/1990 Ohtsuka et al. ............. 329/316
5,383,224 A * 1/1995 Mizoguchi ................... 375/346
5,644,592 A * 7/1997 Divsalar et al. ............. 375/147
5,760,740 A * 6/1998 Blodgett ..................... 342/362
5,838,740 A * 11/1998 Kallman et al. ............. 375/346

FOREIGN PATENT DOCUMENTS

| EP | 0553873 | 8/1993 | ............ H04B/1/12 |
| EP | 0762660 | 3/1997 | ............ H04B/1/12 |

* cited by examiner

Primary Examiner—Stephen Chin
Assistant Examiner—David B. Lugo
(74) Attorney, Agent, or Firm—Joseph S. Tripoli; Joseph J. Laks; Ronald H. Kurdyla (57) ABSTRACT

A system for receiving a plurality of broadcast channels transmitted with different polarizations includes a first demodulator for demodulating a first channel having a first polarization to produce a first demodulated channel signal, and a second demodulator for demodulating a second channel having a second polarization, opposite to the first polarization, to produce a second demodulated channel signal. An adaptive interference cancellation network, coupled to the first and second demodulators, cancels interference, derived from the second channel, in the first demodulated channel signal to produce a received signal.

10 Claims, 5 Drawing Sheets

OPPOSITE POLARIZATION INTERFERENCE CANCELLATION IN SATELLITE COMMUNICATION

FIELD OF THE INVENTION

The present invention relates to a system for canceling interference in a polarized transmission channel caused by a frequency adjacent, or overlapping, channel of opposite polarization.

BACKGROUND OF THE INVENTION

In satellite transmission systems, a plurality of transponders on the satellite are tuned to transmit a corresponding plurality of respective carrier frequencies arranged in a band of frequencies. In order to minimize interference between transponders, each transponder transmits on an antenna which is polarized. In one satellite system, e.g. the direct satellite system (DSS), the transponders transmit carriers at frequencies which are mutually different from those of all the other transponders. Each transponder transmits through an antenna which is circularly polarized. Transponders transmitting carriers adjacent in frequency are oppositely-polarized. For example if one transponder transmits at one carrier frequency and transmits through a right-hand-circularly-polarized (RHCP) antenna, then the transponder which transmits at the next adjacent carrier frequency is left-hand-circularly-polarized (LHCP). In another satellite system, two transponders transmit on a single frequency. One transponder transmits on a RHCP antenna, and the second transponder transmits on a LHCP antenna.

In an ideal implementation, using a professional grade receiving antenna, opposite polarization rejection ratios of 30 dB can be achieved. In an implementation using a consumer grade receiving antenna, the opposite polarization rejection drops to 20 dB. Furthermore, antennas configured for separately receiving oppositely polarized signals are optimized for performance at a single frequency, generally in the middle of the band of frequencies, and, therefore, operate less than optimally over a range of frequencies. In addition, atmospheric conditions may shift the polarization of the signals, further degrading the performance of the system.

Current satellite systems use modulation and coding techniques, and adjust throughput, in such a manner as to be able to function acceptably under the conditions present in the transmission system, as described above. For example, DSS systems use quaternary phase shift keying (QPSK) for modulating in-phase and quadrature carrier components with coded data at a predetermined symbol rate, in a known manner. However, it is always desirable to increase the throughput in a communications system. The increased throughput can be used to increase the number of channels which may be transmitted through the satellite, and/or to transmit extra information in existing channels to provide additional features such as higher definition images. It is further desirable in a consumer transmission system, such as the DSS system, to increase the throughput for new receivers incorporating new features, while retaining backward compatibility with existing consumer receivers.

To increase the throughput, it is necessary to increase the rejection of frequency adjacent or overlapping, oppositely polarized, signals beyond the 20 dB level. However, it is not possible to do this by increasing the power output of the transponder or by improving the performance of the transmitting antenna in the satellite, or by improving the performance of the receiving antenna, which would unacceptably increase the cost of the antenna to the consumer, nor by increasing the power output of the transponders on the satellite.

BRIEF SUMMARY OF THE INVENTION

In accordance with principles of the present invention, a system for receiving a plurality of broadcast channels transmitted with different polarizations includes a first demodulator for demodulating a first channel having a first polarization to produce a first demodulated channel signal, and a second demodulator for demodulating a second channel having a second polarization, oppositely polarized with respect to the first polarization, to produce a second demodulated channel signal. An adaptive interference cancellation network, coupled to the first and second demodulators, cancels interference derived from the second channel in the first demodulated channel signal to produce a received signal.

By using electronic adaptive interference cancellation techniques to cancel interference from frequency adjacent or overlapping, oppositely polarized, broadcast channels, the rejection of those channels can be increased sufficiently that the throughput of the desired channel can be increased. For example, hierarchical quadrature amplitude modulation (QAM) of the transmitted carrier can be used to increase the bit rate of the channel, while maintaining backward compatibility. Specifically, instead of QPSK modulation, hierarchical 16 QAM or 64 QAM may be used to double or triple the number of data bits conveyed in each transmitted symbol. Current QPSK receivers can receive the first level QPSK signal transmitted on such a channel, while newer receivers, with hierarchical QAM receivers can receive the complete QAM signal, provided the opposite polarization interference from channels adjacent in frequency is sufficiently reduced using the system according to the present invention.

DETAILED DESCRIPTION OF THE INVENTION

Figure 1:
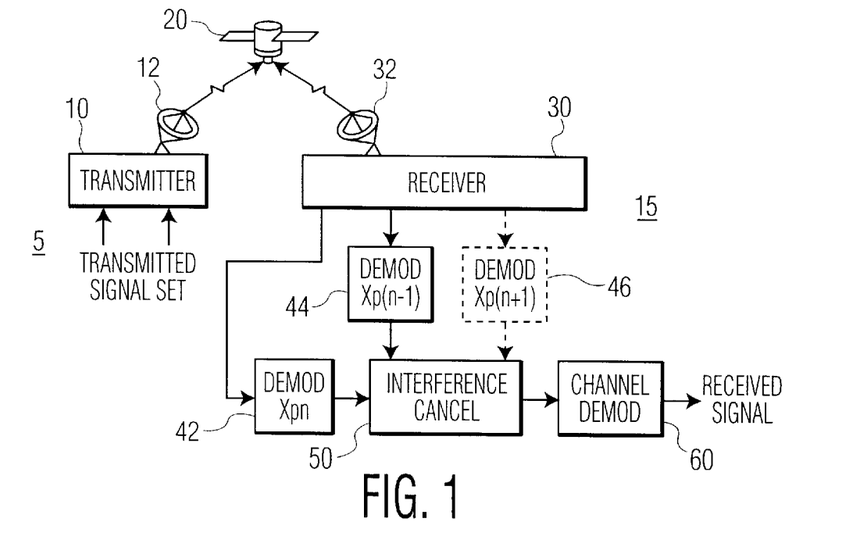
FIG. 1 is a block diagram of a transmission system according to the present invention.

FIG. 1 is a block diagram of a transmission system according to the present invention. In FIG. 1, an input terminal 5 is coupled to a set of sources (not shown) of channel signals to be transmitted. For example, the channel signal sources may each produce a television signal, including a video and audio component, among other things. The input terminal 5 is coupled to an input terminal of a transmitter 10. The transmitter 10 operates in a known manner to compress and encode each of the channel signals, modulate them on RF carrier signals, then transmit the modulated carriers to a satellite 20 via a transmitter antenna 12. The satellite 20 receives the channel signals, and retransmits them on separate transponders. The transponders are tuned to different frequencies, and are coupled to respective polarized antennas in the satellite 20.

Figure 2:
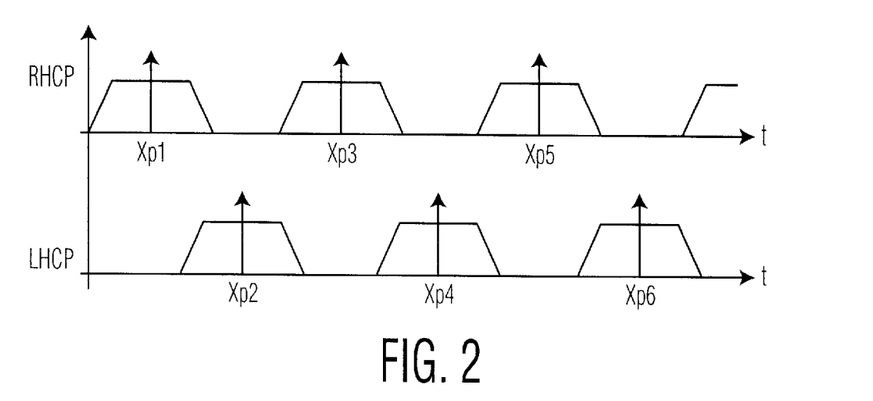
FIGS. 2 and 3 are spectrum diagrams illustrating the spectral layout of two different transmission systems.
Figure 3:
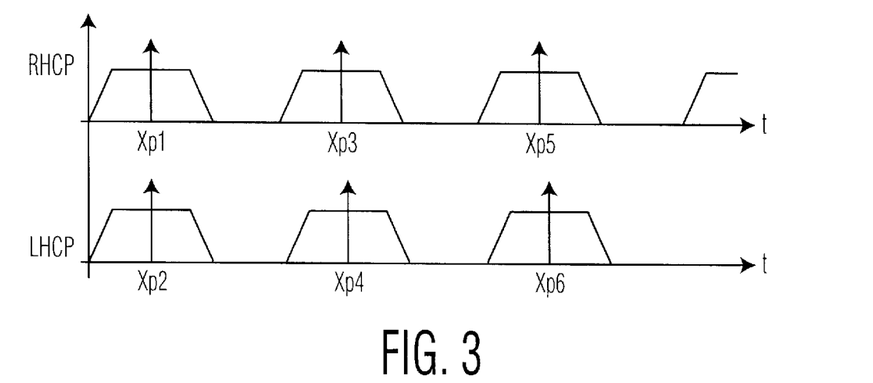

FIGS. 2 and 3 are spectrum diagrams illustrating the spectral layout of two different transmission systems. In FIGS. 2 and 3, carrier frequencies are illustrated by arrows along the frequency axis and sidebands, carrying the channel signal information, are illustrated as trapezoids around the carrier frequency. The upper frequency axis illustrates the channel signals transmitted by a RHCP antenna and the lower frequency axis illustrates the channel signals transmitted by a LHCP antenna.

In FIG. 2, illustrating the DSS frequency spectrum, a first transponder transmits a first channel, is tuned to a first frequency Xp1, and is coupled to a RHCP antenna. A second transponder transmits a second channel, is tuned to a second frequency Xp2 adjacent to the first frequency Xp1, and is coupled to a LHCP antenna. A third transponder transmits a third channel, is tuned to a third frequency Xp3 adjacent to the second frequency Xp2, and is coupled to a RHCP antenna, and so forth. As illustrated, there may be some overlap of the sidebands of carriers adjacent in frequency, but the carriers are non-overlapping in frequency. Carriers which are adjacent in frequency are transmitted by antennas which are oppositely polarized.

In FIG. 3, a first transponder transmits a first channel and is tuned to a frequency Xp1, and a second transponder transmits a second channel and is tuned to a frequency Xp2 which is the same frequency as Xp1. The first transponder is coupled to a RHCP antenna and the second transponder is coupled to a LHCP antenna. A third transponder transmits a third channel and is tuned to a third frequency Xp3, and a fourth transponder transmits a fourth channel and is tuned to a frequency Xp4 which is the same frequency as Xp3, and so forth. This system includes carriers which are co-located, but transmitted on oppositely polarized antennas.

The satellite 20 transmits the spectrum illustrated in one of FIG. 2 or 3 to a receiving system 15 via a receiving antenna 32. The receiving antenna 32 includes both a RHCP and LHCP antenna portion and is coupled to a receiver 30. The receiver 30 has a first output terminal coupled to a first demodulator 42 and a second output terminal coupled to a second demodulator 44. An output terminal of the first demodulator 42 is coupled to a first input terminal of an interference cancellation circuit 50, and a n output terminal of the second demodulator 44 is coupled to a second input terminal of the interference cancellation circuit 50.

An output terminal of the interference cancellation circuit 50 is coupled to an input terminal of a channel demodulator 60. An output terminal of the channel demodulator 60 produces the received channel signal, and is coupled to utilization circuitry (not shown). The utilization circuitry, for example, may include circuitry to extract the television signal from the received channel signal, produce an image representing the video component of the television signal on a display device and the sound representing the audio component of the television signal on a speaker.

In operation, the transmitter 10 transmits the plurality of broadcast channels through a satellite 20 link to one of many receivers 15. Current DSS transmission systems use QPSK modulation techniques which operate satisfactorily with consumer grade receiving antennas 32. However, to receive higher order QAM modulated signals, carrying more information, satisfactorily, interference from frequency adjacent channels must b e suppressed, as described above.

The receiver 30, under user control, selects a carrier carrying a desired channel. The selected carrier is extracted and further processed. For example, in a DSS system, that carrier is processed to extract the television program being transmitted on the channel carried by that carrier and display the program on a television receiver.

In accordance with the present invention, interference from adjacent channels is suppressed electronically at the receiver 15. Referring first to the spectrum illustrated in FIG. 3, having co-located carriers transmitted on oppositely polarized antennas, the first demodulator 42 is tuned to the frequency and antenna polarization carrying the selected channel, e.g. Xp3, while the second demodulator 44 is tuned to the same frequency, but receives its signal from the oppositely polarized antenna, e.g. Xp4.

The selected demodulated channel Xp3 from the first demodulator 42 and the oppositely polarized demodulated channel Xp4 from the second demodulator 44 are processed in the interference cancellation circuit 50. The interference cancellation circuit 50 derives an interference component in the selected demodulated channel Xp3 from the oppositely polarized demodulated channel Xp4, and suppresses that interference component in the selected demodulated channel in a manner to be described in more detail below.

Referring now to the DSS spectrum illustrated in FIG. 2, in which adjacent carriers are not overlapping in frequency, it is necessary to derive the interference component in a selected demodulated channel from the two frequency adjacent signals. That is, the first demodulator 42 is tuned to the frequency and corresponding antenna polarization carrying the selected channel, e.g. Xp3. The second demodulator 44 is tuned to one of the two adjacent frequencies and its corresponding antenna polarization carrying a first adjacent channel, e.g. Xp2. In this arrangement, however, a third demodulator 46, illustrated in phantom in FIG. 1 is coupled between the receiver 30 and the interference cancellation circuit 50 in the same manner as the second demodulator 44. The third demodulator 46 is turned to the other one of the two adjacent frequencies and its corresponding antenna polarization carrying a second adjacent channel, e.g. Xp4.

The selected demodulated channel from the first demodulator 42 and the two frequency adjacent oppositely polarized demodulated channels from the second demodulator 44 and the third demodulator 46 are processed in the interference cancellation circuit 50. The interference cancellation circuit 50 derives an interference component in the selected demodulated channel from the two oppositely polarized demodulated channels, and suppresses the interference component from the selected demodulated channel in a manner also to be described in more detail below.

One skilled in the art will understand that it may be necessary to process additional adjacent channels in the interference cancellation circuit 50 in order to sufficiently suppress the opposite-polarized-channel interference so that the higher order QAM modulation techniques may be used. Continuing the example above with respect to FIG. 2, additional demodulators, coupled between the receiver 30 and the interference cancellation circuit 50 can be tuned to channels next adjacent in frequency, e.g. Xp1 and Xp5. The interference cancellation circuit 50 processes the selected channel Xp3 and all of the adjacent channels Xp1, Xp2, Xp4 and Xp5 to derive the interference component, and suppresses the interference component in the selected channel Xp3. In the example of FIG. 3, the interference cancellation circuit 50 processes the selected channel Xp3 and the co-located, but oppositely polarized, channel Xp4 to derive the interference component, and suppresses the interference component in the selected channel Xp3.

In either arrangement, the signal produced by the interference cancellation circuit 50 is the selected channel with opposite polarization interference canceled. This signal is then demodulated by the channel demodulator 60 to produce the channel signal. The channel signal is then further processed by the utilization circuitry (not shown) in the manner described above.

One skilled in the art will understand that the channel demodulator 60 may be incorporated in the demodulator 42, and not in a separate element as is illustrated in FIG. 1. Alternatively, the demodulator 42 may be incorporated in the channel demodulator 60 and not as a separate element. In this case the output of the receiver 30 is coupled directly to the interference cancellation circuit 50.

Figure 4:
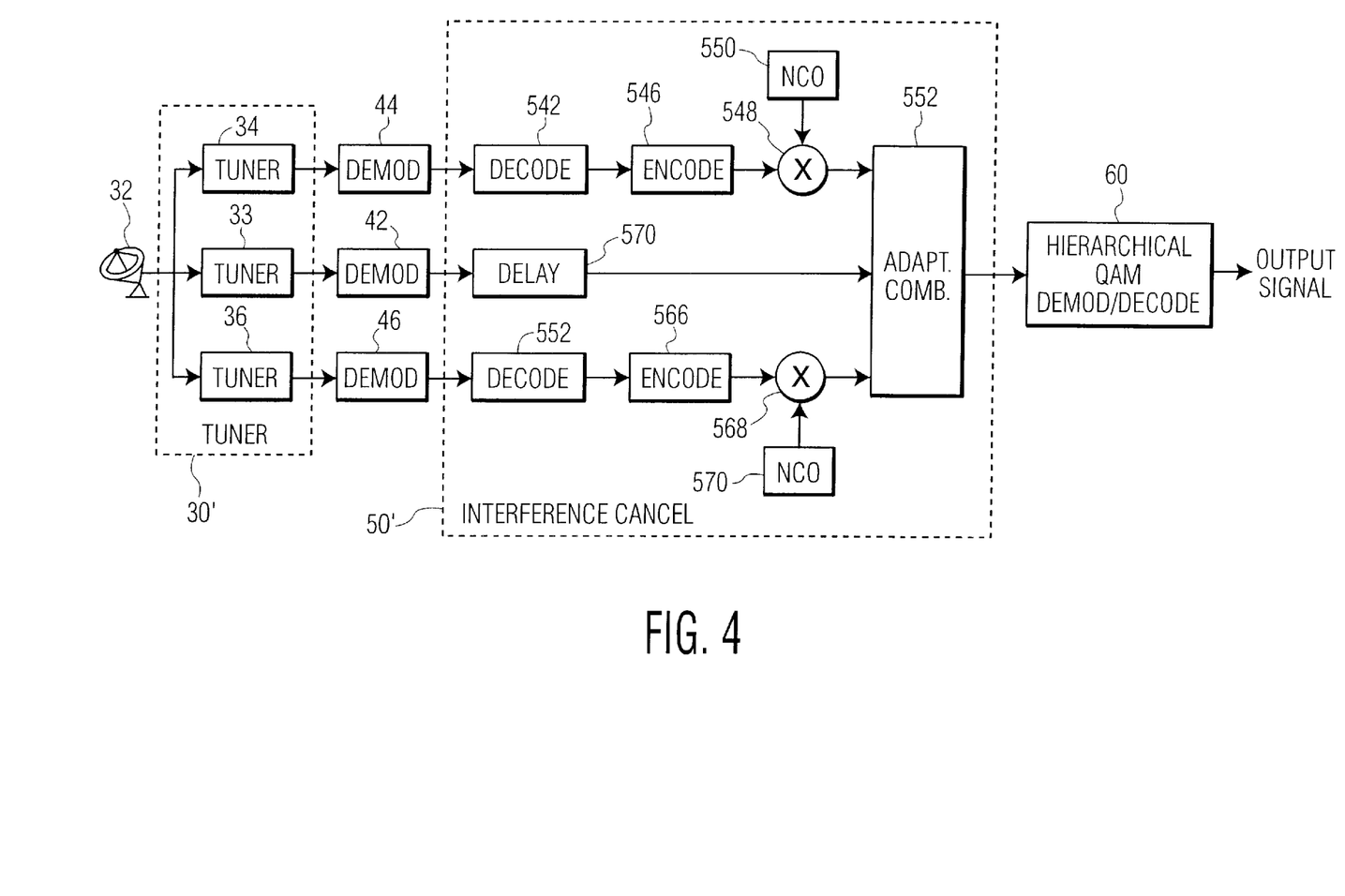
FIGS. 4 and 5 are more detailed block diagrams of portions of the receiving system illustrated in FIG. 1.
Figure 5:
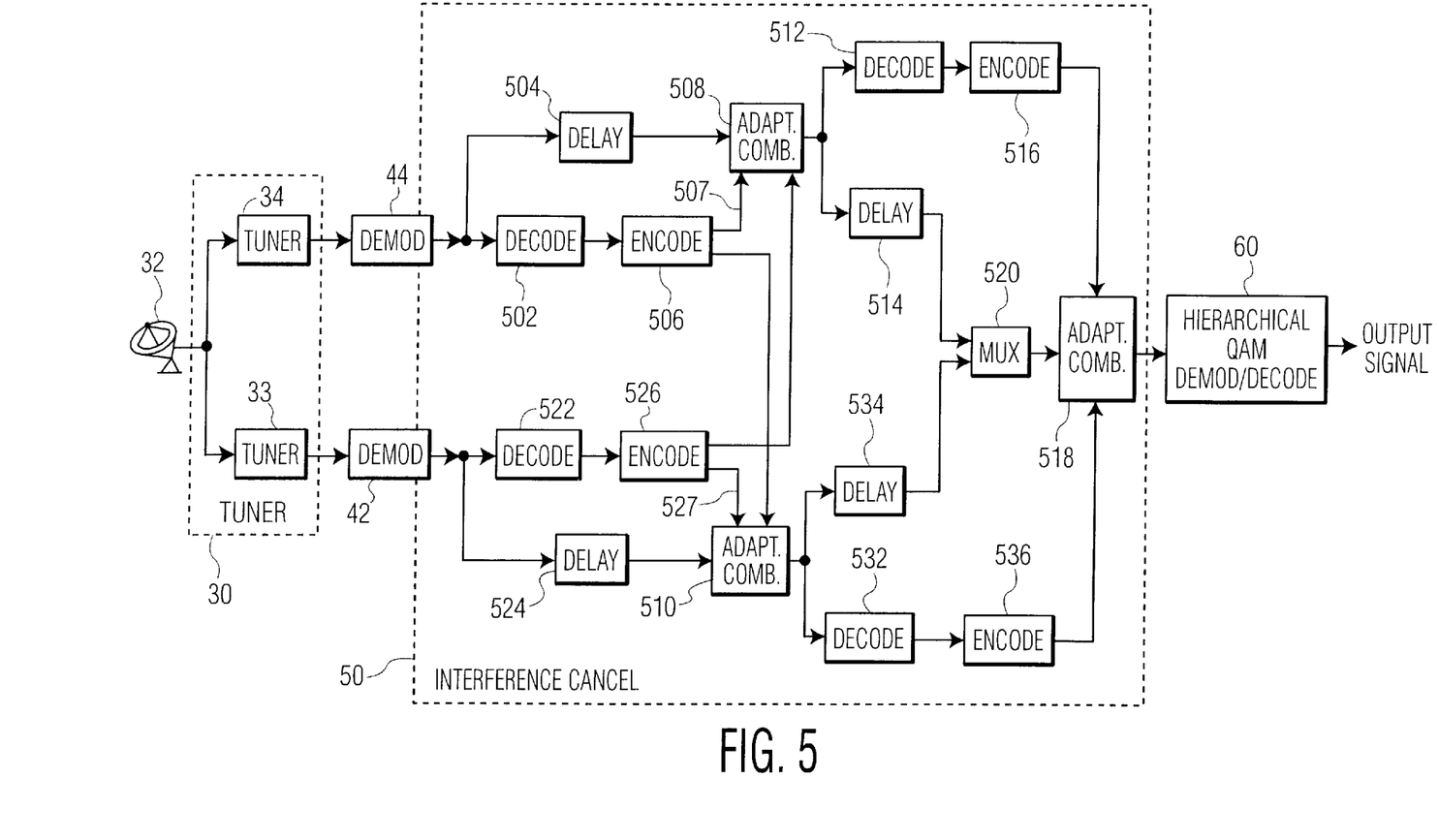

FIGS. 4 and 5 are more detailed block diagrams of portions of the receiving system illustrated in FIG. 1. FIG. 4 illustrates in more detail a DSS system (FIG. 2) according to the present invention. In FIG. 4, elements which are the same as those illustrated in FIG. 1 are designated by the same reference number and will not b e described in more detail below. In FIG. 4, a receiving antenna 3 2 includes a RHCP and a LHCP portions, and is arranged to receive the plurality of channels transmitted by the satellite 20 (of FIG. 1). Receiving antenna 32 is coupled to respective input terminals of a first tuner 34, a second tuner 35 and a third tuner 36, all within the receiver 30 (of FIG. 1). An output terminal of the second tuner 35 is coupled to an input terminal of a first demodulator 44; and an output terminal of the third tuner 36 is coupled to an input terminal of a second demodulator 46.

An output terminal of the first tuner 34 is coupled to an input terminal of a delay 570. An output terminal of the delay 570 is coupled to a first input terminal of an adaptive combiner 552. An output terminal of the first demodulator 44 is coupled to an input terminal of a first decoder 542. An output terminal of the first decoder 542 is coupled to an input terminal of a first encoder 546. An output terminal of the first encoder 546 is coupled to a first input terminal of a first mixer 548. An output terminal of a first numerically controller oscillator (NCO) 550 is coupled to a second input terminal of the first mixer. An output terminal of the first mixer is coupled to a second input terminal of the adaptive combiner 552.

An output terminal of the second demodulator 46 is coupled to an input terminal of a second decoder 562. An output terminal of the second decoder 562 is coupled to an input terminal of a second encoder 566. An output terminal of the second encoder 566 is coupled to a first input terminal of a second mixer 568. An output terminal of a second NCO 570 is coupled to a second input terminal of the second mixer 568. An output terminal of the second mixer 568 is coupled to a third input terminal of the adaptive combiner 552. An output terminal of the adaptive combiner 552 is coupled to an input terminal of a hierarchical QAM demodulator/decoder 60. An output terminal of the hierarchical QAM demodulator/decoder 60 generates the decoded channel data, and is coupled to utilization circuitry (not shown) as described above.

In known hierarchical QAM encoding, a first coding level is represented by a QPSK code where the quadrant in which the received signal lies provides a first two bits of the transmitted symbol (i.e. one of four possible quadrants). This corresponds to the decoding done in a standard DSS receiver. An ideal QPSK signal representing the received first two bits is then recreated and subtracted from the received signal to generate a difference signal representing a second coding level signal 6 dB down in signal strength. The same processing is repeated on the second level coding signal, i.e. detecting the quadrant in which the second level coding signal, also represented by a QPSK coding, lies to determine two more bits in the symbol, and subtracting a recreated ideal signal representing those two bits to generate a signal representing a third level coding signal 12 dB down in signal strength, and so forth until all levels of the hierarchical QAM signal are decoded.

In operation, tuner 34 produces the selected channel signal, while tuners 35 and 36 provide the frequency adjacent, oppositely polarized channel signals. The decoders 542 and 562 may be known Viterbi decoders, and provide a first level QAM decoding function in a known manner. Because the 20 dB signal to noise ratio provided by consumer grade antennas (as described above) is sufficient to accurately decode current QPSK signals, the first level decoding provided by decoders 542 and 562 will be relatively accurate. In fact, it may be possible to use hard decisions for the decoders 542 and 562, instead of the Viterbi decoders. The encoders 546 and 566 reproduce the ideal QPSK signals representing the decoded signals from decoders 542 and 562, respectively. The mixer 548 and NCO 550 and the mixer 568 and NCO 570 operate to remodulate the adjacent channel signals to the frequency of the selected signal at Xp3.

The remodulated ideal QPSK signals from the frequency adjacent channels from mixers 548 and 568, respectively, and the delayed modulated desired channel from tuner 34 are processed in the adaptive combiner 552. The delay circuit 570 is provided to compensate for the processing delays through the decoders 542 and 562, encoders 546 and 566 and mixers 548 and 568 respectively, and provide the three signals to the adaptive combiner aligned in time. The adaptive combiner 552 analyzes the signals from mixers 548 and 568, respectively, and estimates the interference component from each of those channels present in the desired channel from delay 570 in a manner to be described in more detail below. Those interference components are subtracted from the desired channel signal to generate a desired channel signal, in which the opposite-polarization interference has been suppressed, at the output terminal of the adaptive combiner 552. By suppressing the opposite-polarization interference, the signal to noise ratio of the desired channel signal is raised sufficiently that the hierarchical QAM modulation may be successfully demodulated and decoded in the hierarchical QAM demodulator/decoder 60.

FIG. 5 illustrates in more detail a co-located carrier system (FIG. 3) according to the present invention. In FIG. 5, a receiving antenna 32 is coupled to respective input terminals of a first tuner 33 and a second tuner 34. An output terminal of the first tuner 33 is coupled to an input terminal of a first demodulator 42. An output terminal of the first demodulator 42 is coupled to respective input terminals of a first decoder 502 and a first delay circuit 504. An output terminal of the first decoder 502 is coupled to an input terminal of a first encoder 506. A first output terminal of the first encoder 506 is coupled to a first input terminal of a first adaptive combiner 508. An output terminal of the first delay circuit 504 is coupled to a second input terminal of the first adaptive combiner 508.

An output terminal of the second tuner 34 is coupled to an input terminal of a second demodulator 44. An output terminal of the second demodulator 44 is coupled to respective input terminals of a second decoder 522 and a second delay circuit 524. An output terminal of the second decoder 522 is coupled to a n input terminal of a second encoder 526. A first output terminal of the second encoder 526 is coupled to a first input terminal of a second adaptive combiner 510. An output terminal of the second delay circuit 524 is coupled to a second input terminal of the adaptive combiner 510. A second output terminal of the first encoder 506 is coupled to a third input terminal of the second adaptive combiner 510, and a second output terminal of the second encoder 526 is coupled to a third input terminal of the first adaptive combiner 508.

An output terminal of the first adaptive combiner 508 is coupled to respective input terminals of a third decoder 512 and a third delay circuit 514. An output terminal of the third decoder 512 is coupled to an input terminal of a third encoder 516. An output terminal of the third encoder 516 is coupled to a first input terminal of a third adaptive combiner 518. An output terminal of the third delay circuit 514 is coupled to a first input terminal of a multiplexer (MUX) 520. An output terminal of the multiplexer 520 is coupled to a second input terminal of the third adaptive combiner 518.

An output terminal of the second adaptive combiner 510 is coupled to respective input terminals of a fourth decoder 532 and a fourth delay circuit 534. An output terminal of the fourth decoder is coupled to an input terminal of a fourth encoder 536. An output terminal of the fourth encoder 536 is coupled to a third input terminal of the third adaptive combiner 518. An output terminal of the fourth delay circuit 534 is coupled to a second input terminal of the multiplexer 520. An output terminal of the third adaptive combiner 518 is coupled to an input terminal of a hierarchical QAM demodulator/decoder 60. An output terminal of the hierarchical demodulator/decoder 60 produces the decoded channel data, and is coupled to utilization circuitry (not shown) as described above.

In operation, the system of FIG. 5 performs a two level hierarchical QAM decoding of the desired channel signal. Tuners 33 and 34 are tuned to the same frequency, but coupled to the RHCP and LHCP portions of the antenna 32, respectively. The received signal from tuner 33 is demodulated by the demodulator 42, and the received signal from tuner 34 is demodulated by demodulator 44.

The signal from demodulator 42 is QPSK decoded by decoder 502. As in FIG. 4, because the signal to noise ratio of the signal is sufficient, either a Viterbi decoder or hard decision decoder may be used. The decoder 502 produces a two bit signal which represents the result of the outer level decoding of the hierarchical QAM signal received by tuner 33. This signal is combined with the results of the decoding of the other levels of that hierarchical QAM signal, and the combination, representing the received symbol, is supplied to the utilization circuitry (not shown). The encoder 506 then produces an ideal QPSK signal representing the two bits decoded from the received signal. This ideal QPSK signal is supplied to the first adaptive combiner 508. The received signal from demodulator 42 is also supplied to the first adaptive combiner through the delay circuit 504, which introduces an appropriate delay to compensate for the processing of the decoder 502 and encoder 506.

Simultaneously, the decoder 522 QPSK decodes the other received signal from demodulator 44, again producing a two bit signal representing the result of the outer level decoding of the hierarchical QAM signal received by tuner 34. This signal is combined with the results of the decoding of other levels of that hierarchical QAM signal received by tuner 34, and the combination, representing the received symbol, is supplied to the utilization circuitry. An ideal QPSK signal representing these two bits is produced by the encoder 526. This signal is also supplied to the first adaptive combiner 508.

In order to complete the outer level hierarchical QAM decoding, the first adaptive combiner 508 subtracts the ideal QPSK signal from encoder 506 from the received signal from the delay 504, producing a signal containing the second level of hierarchical QAM coding, in a known manner. The first adaptive combiner 508 also analyzes the ideal QPSK signal from the co-located, oppositely polarized, channel from encoder 526, and estimates the interference component from that signal present in the received signal from the delay circuit 504. The first adaptive combiner 508 then subtracts this interference component from the received signal from delay 504 to produce a signal in which opposite polarization interference from the other received signal has been suppressed and containing the second level hierarchical QAM signal. The second adaptive combiner 510, similarly produces a signal in which opposite polarization interference from the other received signal has been suppressed and containing the second level QAM signal.

The multiplexer 520 selects one of the second level hierarchical QAM interference-canceled signals from either the first adaptive combiner 508 (through delay circuit 514) or the second adaptive combiner 510 (through delay circuit 534). A second level QAM decoding is performed on the first received signal by the third decoder 512, third encoder 516, fourth decoder 532, fourth encoder 536 and the third adaptive combiner 518, in the same manner described above for the first level QAM decoding. That is, the selected second level hierarchical QAM encoded signal is decoded by its associated decoder (512 or 532) to produce two further bits representing the second level decoding of the hierarchical QAM signal of the received symbol. These bits are combined with the two bits resulting from the outer level hierarchical QAM decoding, and with bits resulting from other level decoding, as described above. Then an ideal QPSK signal representing those two bits is produced by the associated encoder (516 or 536). The ideal signal from the associated encoder is subtracted from the selected second level QAM encoded signal to produce a third level QAM encoded signal. Simultaneously, the ideal signal from the other encoder is analyzed to determine the opposite-polarization interference component from that signal in the selected signal. That interference component is subtracted from the selected second level hierarchical QAM signal to produce an interference canceled third level hierarchical QAM signal at the output terminal of the third adaptive combiner 518. Further levels of hierarchical QAM decoding may be performed in a manner similar to that described above by the hierarchical QAM demodulator/decoder 60.

FIG. 5 has been described for use in an hierarchical QAM encoded system. However, the same interference cancellation technique can be used in a standard (meaning non-hierarchical) QAM encoded system. In such a system, a hard decoding of the outer level constellation is required because the complete constellation is required to decode the signal in the QAM demodulator/decoder 60. Furthermore, it is not possible to subtract an outer level hierarchical QAM signal from the received QAM signal to produce a second level QAM signal, or to subtract a second level QAM signal from the received QAM signal to form a third level QAM signal, etc.

Thus, there is no need to couple the encoder 506 to the first adaptive combiner 508, or the encoder 526 to the second adaptive combiner 510. Consequently signal lines 507 and 527 will be omitted in such a system. The signals at the respective output terminals of the first and second adaptive combiners 508 and 510, in this case, will include the complete QAM constellation. A signal representing the opposite polarity interference is produced by the series connection of the hard decoder (502,522) and encoder (506,526) coupled to the demodulator (42,44) processing the oppositely polarized received signal. This opposite polarity interference signal is canceled from the selected signal in the adaptive combiner (508, 510) coupled to the demodulator (42,44) processing the selected signal.

In this arrangement, the adaptive combiners 508 and 510 will include only two input terminals: one for the received signal and one for the signal representing the opposite-polarization interference from the co-located, oppositely polarized signal. For the same reasons, the adaptive combiner 518 will be responsive to only two of three input signals. One from the multiplexer 520, representing the selected signal, and a second from the encoder (516 or 536) producing a signal representing the oppositely polarized signal.

For example, in one embodiment, decoders 502 and 522 could be hard decoders for decoding four symbol QAM, and decoders 512 and 532 could be hard decoders for decoding 16 symbol QAM. Alternatively, decoders 502 and 522 could be hard decoders for decoding 16 symbol QAM, if the interference is limited and the SNR is sufficient. In this embodiment, the number of stages can be reduced.

Figure 6:
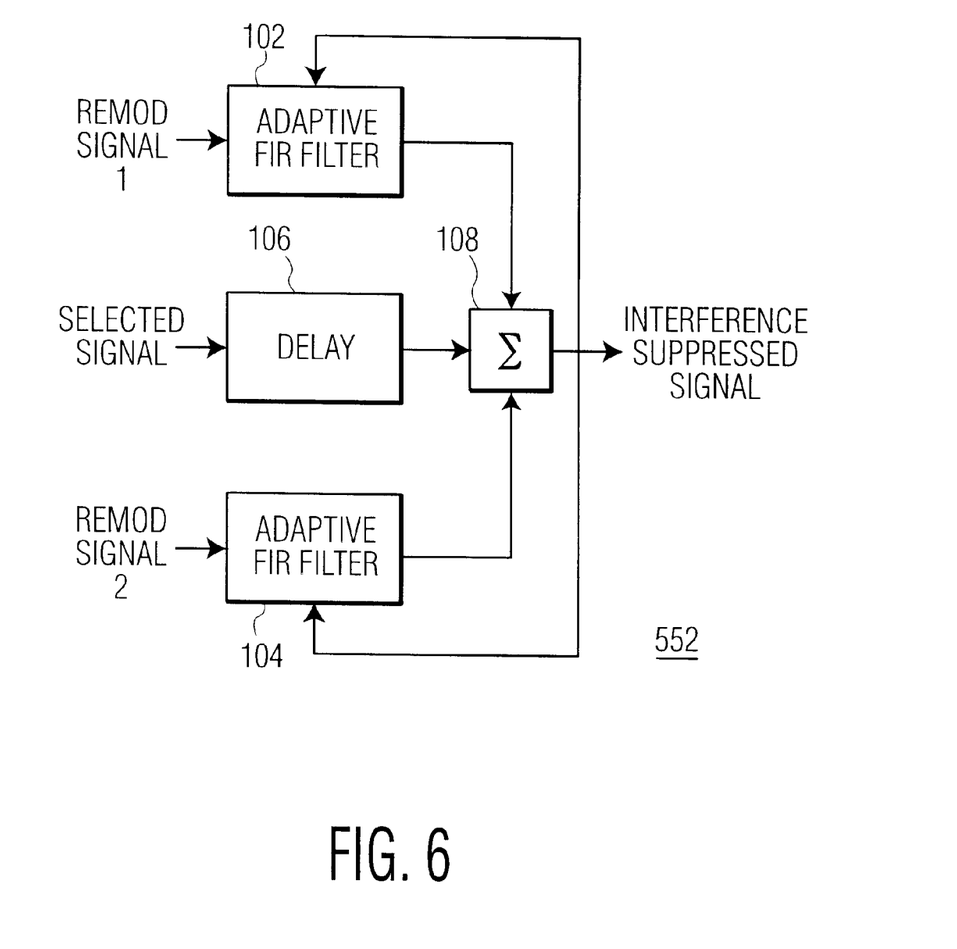
FIG. 6 is a block diagram of an adaptive combiner which may be used in the transmission system illustrated in FIG. 1.

The adaptive combiners illustrated in FIG. 4 as element 552, and in FIG. 5 as elements 508, 510, and 518, are all constructed similarly. An exemplary arrangement of adaptive combiner 552 is illustrated in FIG. 6. In FIG. 6, a selected signal (for example, from the delay circuit 570 in FIG. 4) is coupled to an input terminal of a delay circuit 106. The delay circuit 106 may be integrated with the delay circuits illustrated in FIGS. 4 and 5 within a single delay circuit having an appropriate delay. An output terminal of the delay circuit 106 is coupled to a first, positive, input terminal of a summer 108. One re-encoded signal is coupled to an input terminal of a first adaptive FIR filter 102, and a second re-encoded signal is coupled to an input terminal of a second adaptive FIR filter 104.

For example, in FIG. 4, the first re-encoded signal is derived from the mixer 548; while the second remodulated signal is derived from the mixer 568. In FIG. 5, referring to adaptive combiner 508, the first remodulated signal is derived from the selected signal, and is produced by the first encoder 506, while the second remodulated signal is derived from the co-located, oppositely polarized channel signal, and is produced by the second encoder 526.

An output terminal of the first adaptive FIR filter 102 is coupled to a second, negative, input terminal of the summer 108, and an output terminal of the second adaptive FIR filter 104 is coupled to a third, negative, input terminal of the summer 108. The signals from the first and second adaptive FIR filters 102 and 104 are subtracted from the delayed selected signal from delay circuit 106. An output terminal of the summer 108 produces the selected signal in which opposite polarization interference has been suppressed and is coupled to respective control input terminals of the first and second adaptive FIR filters.

In operation, each adaptive FIR filter generates a signal representing the interference component represented by the oppositely polarized signal coupled to its input terminal, in response to a control signal supplied to its control input terminal, all in a known manner. The control signal is derived from the interference suppressed channel signal produced by the summer 108.

Figure 7:
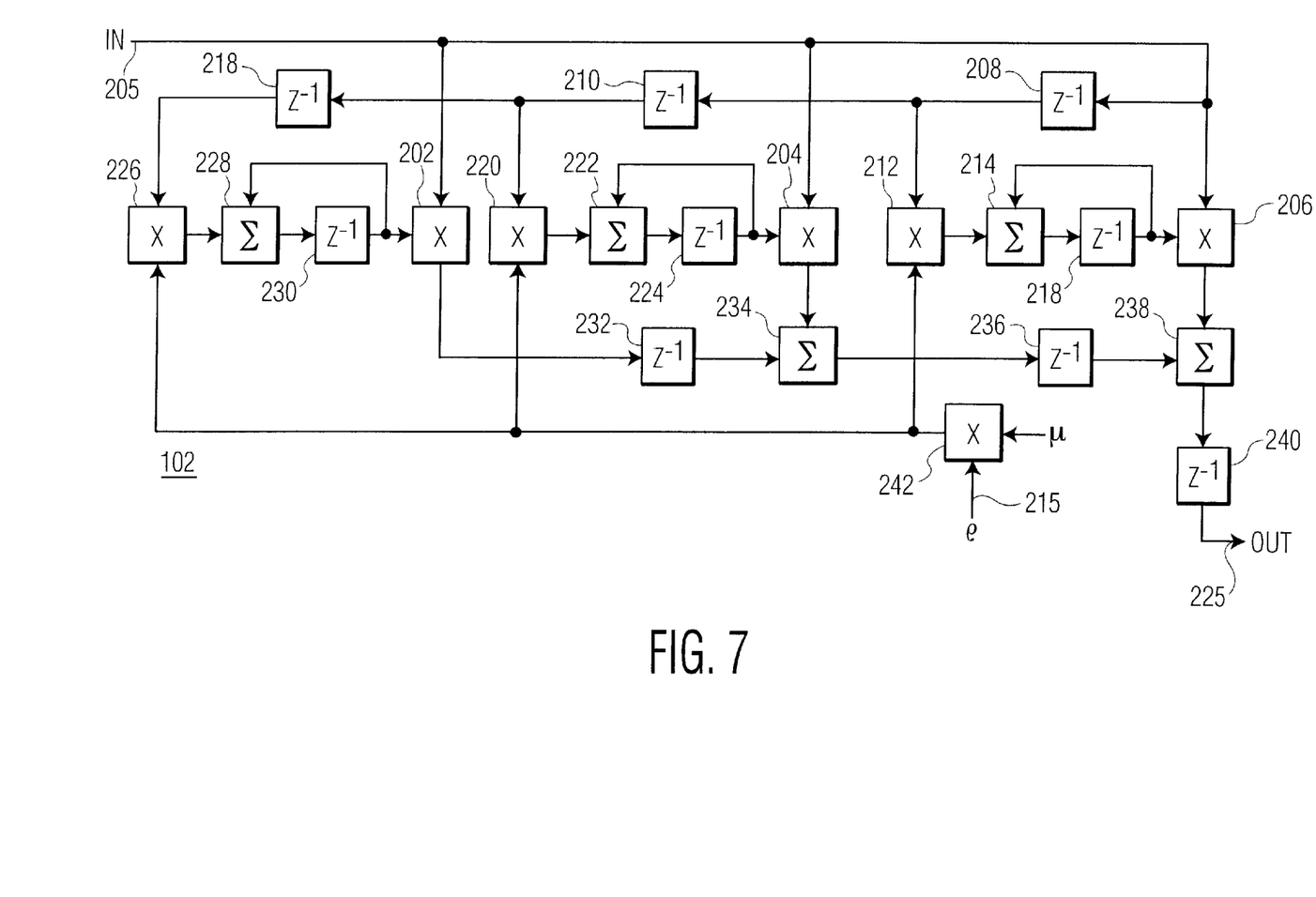
FIG. 7 is a block diagram of an adaptive FIR filter which may be used in the adaptive combiner illustrated in FIG. 6.

FIG. 7 is a block diagram of an adaptive FIR filter which may be used in the adaptive combiner illustrated in FIG. 6. In FIG. 7, an input terminal 205 is coupled to receive, a remodulated channel signal as illustrated in FIG. 6. The input terminal 205 is coupled to respective first input terminals of a first multiplier 202, a second multiplier 204 and a third multiplier 206, and to an input terminal of a first delay circuit 208. An output terminal of the first delay circuit 208 is coupled to an input terminal of a second delay circuit 210 and to a first input terminal of a fourth multiplier 212. An output terminal of the fourth multiplier 212 is coupled to a first input terminal of a first summer 214. An output terminal of the first summer 214 is coupled to an input terminal of a third delay circuit 216. An output terminal of the third delay circuit 216 is coupled to a second input terminal of the third multiplier 206 and to a second input terminal of the first summer 214.

An output terminal of the second delay circuit 210 is coupled to an input terminal of a fourth delay circuit 218 and to a first input terminal of a fifth multiplier 220. An output terminal of the fifth multiplier 220 is coupled to a first input terminal of a second summer 222. An output terminal of the second summer 222 is coupled to an input terminal of a fifth delay circuit 224. An output terminal of the fifth delay circuit 224 is coupled to a second input terminal of the second multiplier 204 an to a second input terminal of the second summer 222.

An output terminal of the fourth delay circuit 218 is coupled to a first input terminal of a sixth multiplier 226. An output terminal of the sixth multiplier 226 is coupled to a first input terminal of a third summer 228. An output terminal of the third summer 228 is coupled to an input terminal of a sixth delay circuit 230. An output terminal of the sixth delay circuit 230 is coupled to a second input terminal of the first multiplier 202 and a second input terminal of the third summer 228.

An output terminal of the first multiplier 202 is coupled to an input terminal of a seventh delay circuit 232. An output terminal of the seventh delay circuit is coupled to a first input terminal of a fourth summer 234. An output terminal of the second multiplier 204 is coupled to a second input terminal of the fourth summer 234. An output terminal of the fourth summer 234 is coupled to an input terminal of an eighth delay circuit 236. An output terminal of the eighth delay circuit 236 is coupled to a first input terminal of a fifth summer 238. An output terminal of the third multiplier 206 is coupled to a second input terminal of the fifth summer 238. An output terminal of the fifth summer 238 is coupled to an input terminal of a ninth delay circuit 240. An output terminal of the ninth delay circuit 240 produces the filtered output signal, and, for example, is coupled to the summer 108 of the adaptive combiner 552 illustrated in FIG. 6.

An input terminal 215 is coupled to receive an error signal $\epsilon$, for example from the output of the summer 108 of the adaptive combiner 552 illustrated in FIG. 6. The input terminal 215 is coupled to a first input terminal of a seventh multiplier 242. A source (not shown) of a constant signal $\mu$ is coupled to a second input terminal of the seventh multiplier 242. An output terminal of the seventh multiplier 242 is coupled to respective second input terminals of the fourth multiplier 212, fifth multiplier 220 and sixth multiplier 226.

The FIR filter of FIG. 7 is a known arrangement of a transposed form of a least mean square (LMS) adaptive FIR filter and operates in a known manner. An LMS FIR filter in direct form may also be used in the adaptive combiner 552 illustrated in FIG. 6. The LMS FIR filter illustrated in FIG. 7 operates in the known manner to minimize the error signal ϵ. In addition, more sophisticated recursive least squares (RLS) FIR filters, also of known design and operation, may be used instead of the illustrated LMS FIR filter. Direct form filters also will provide acceptable performance.

What is claimed is:

1. A system for receiving a plurality of broadcast channels, said broadcast channels being transmitted having different polarizations, comprising:
   a first demodulator for demodulating a first channel having a first polarization to produce a first demodulated channel signal;
   a second demodulator for demodulating a second channel having a second polarization opposite to the first polarization to produce a second demodulated channel signal; and
   an adaptive interference cancellation network, coupled to the first and second demodulators, for canceling interference in one of said first and second demodulated channel signals by means of a decoder for generating decoded symbol data from the other of said demodulated channel signals and an encoder for re-encoding said symbol data for generating an ideal signal for use in interference cancellation of a received signal.

2. The system of claim 1 wherein:
   the plurality of broadcast channels are transmitted on respective frequencies in a block of frequencies in which two channels are broadcast on every frequency oppositely polarized with respect to each other; and
   the first and second channels are transmitted at the same frequency.

3. The system of claim 2 wherein each broadcast channel is encoded to comprise sequential symbols and the adaptive interference cancellation network comprises:
   a decoder, coupled to the second demodulator, to generate a signal representing decoded sequential symbols in the second channel;
   an encoder, coupled to the decoder, to generate an ideal signal representing the decoded sequential symbols in the second channel; and
   an adaptive combiner, coupled to the first demodulator, and the encoder, for estimating an interference component from the ideal signal representing the second channel in the first channel and canceling the interference component from the first channel.

4. The system of claim 3 wherein the adaptive combiner comprises:
   an adaptive filter coupled to the encoder, and responsive to a control signal; and
   a summer, coupled to the first demodulator and the adaptive filter for generating the control signal.

5. The system of claim 3 further comprising a second decoder, coupled to the first demodulator, to generate a signal representing decoded sequential signals in the first channel.

6. The system of claim 1 wherein:
   the plurality of broadcast channels are transmitted on respective frequencies in a block of frequencies in which channels at adjacent frequencies are oppositely polarized with respect to each other; and
   the first channel and the second channel are transmitted at adjacent frequencies.

7. The system of claim 6 further comprising:
   a third demodulator for demodulating a third channel frequency adjacent to the first channel and having the second polarization, oppositely polarized with respect to the first polarization, to produce a third demodulated channel signal; and
   the adaptive interference cancellation network, is further coupled to the third demodulator, for canceling interference in said first demodulated channel signal to produce a received signal, said interference being derived from said second and third channels.

8. The system of claim 7 wherein each broadcast channel is encoded to comprise sequential symbols and the adaptive interference cancellation network comprises:
   a first decoder, coupled to the second demodulator, to generate a signal representing decoded sequential symbols in the second channel;
   an first encoder, coupled to the first decoder, to generate an ideal signal representing the decoded sequential symbols in the second channel;
   a second decoder, coupled to the third demodulator, to generate a signal representing decoded sequential symbols in the third channel;
   an second encoder, coupled to the second decoder, to generate an ideal signal representing the decoded sequential symbols in the third channel; and
   an adaptive combiner, coupled to the first demodulator, and the first and second encoders, for estimating an interference component from the respective ideal signals representing the second and third channels in the first channel and canceling the interference component from the first channel.

9. The system of claim 8 wherein the adaptive combiner comprises:
   a first adaptive filter, coupled to the first encoder, and responsive to a control signal;
   a second adaptive filter, coupled to the second encoder, and responsive to the control signal; and
   a summer, coupled to the first demodulator, and the first and second adaptive filters, for generating the control signal.

10. The system of claim 8 further comprising a third decoder, coupled to the first demodulator, to generate a signal representing decoded sequential signals in the first channel.

* * * * *